July 20, 1965    R. I. MOORE    3,195,915
STEERING TORQUE LIMITING DEVICE
Filed June 6, 1963    2 Sheets-Sheet 1
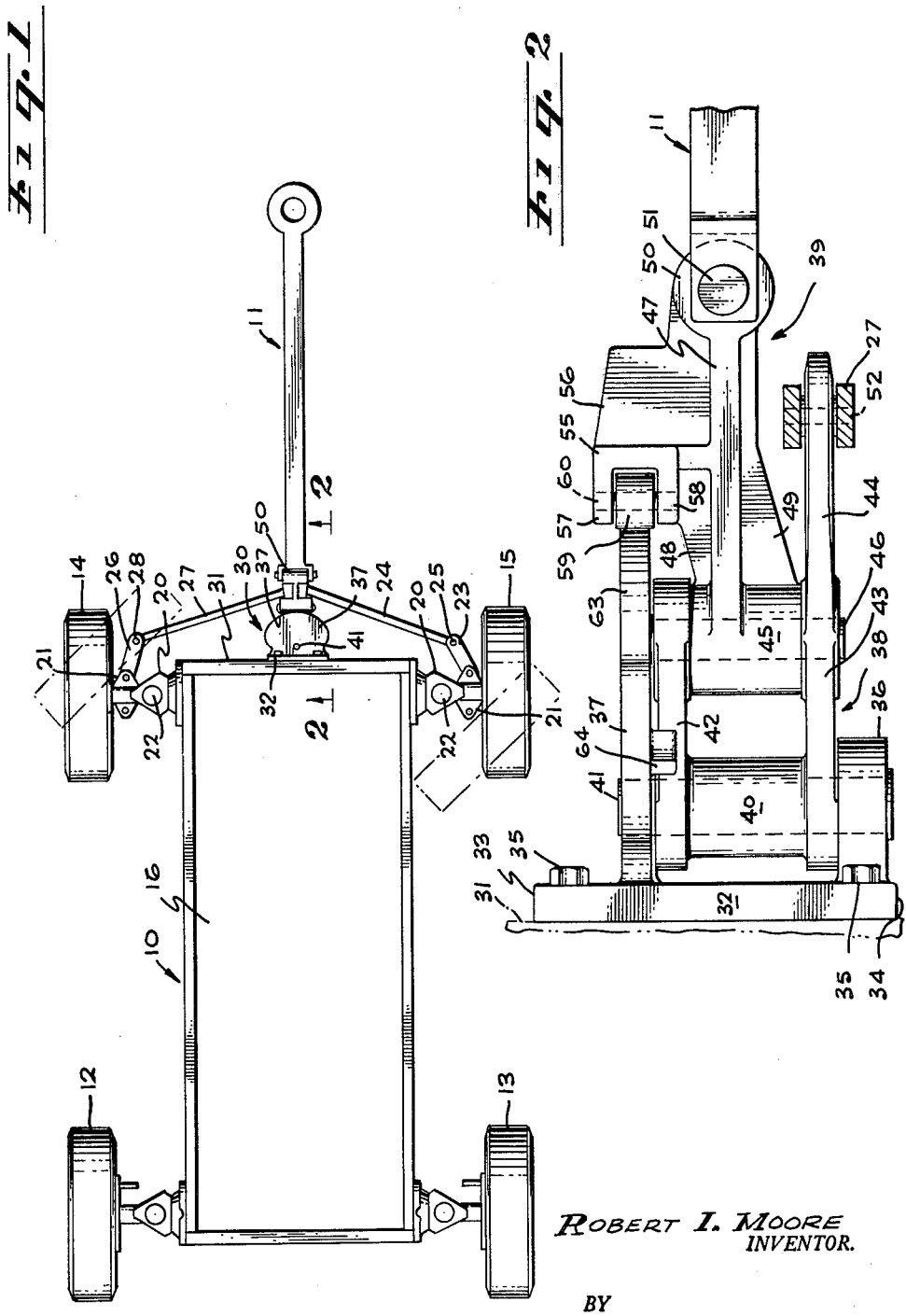
ROBERT I. MOORE
INVENTOR.
BY
Beehler & Shanahan
ATTORNEYS

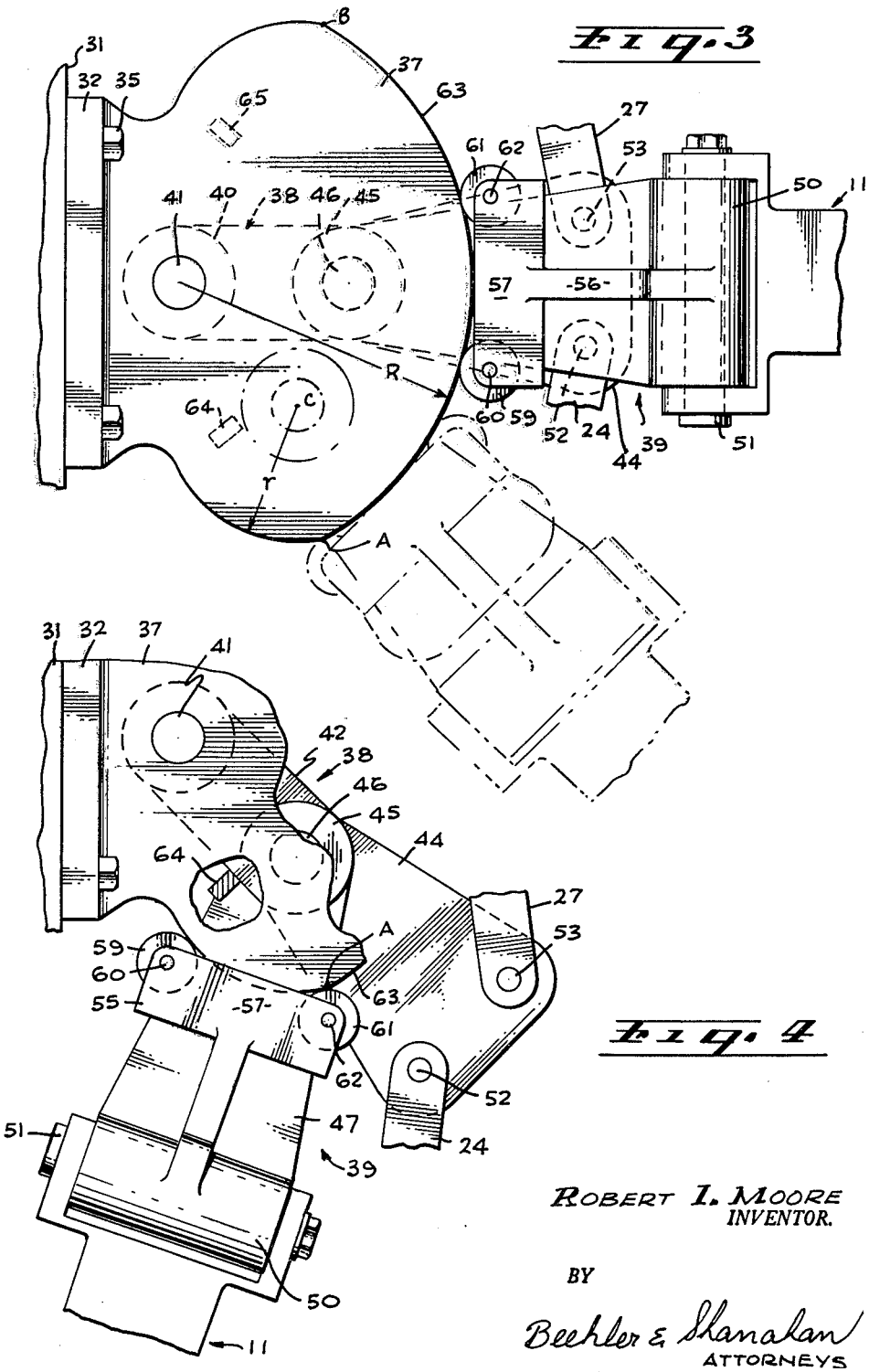

United States Patent Office 3,195,915
Patented July 20, 1965

3,195,915
STEERING TORQUE LIMITING DEVICE
Robert I. Moore, 3235 San Fernando Road,
Los Angeles, Calif.
Filed June 6, 1963, Ser. No. 285,930
7 Claims. (Cl. 280—103)

The invention relates to towbar or drawbar equipment for the towing of trailers and particularly trailers having steerable wheels, which are towed by means of a tractor unit or some appropriate towing vehicle. The invention is especially advantageous when incorporated in a towbar device which is attached by means of tie-rods to the usual knuckle joints for wheels which enjoy automobile type steering.

One of the commonest difficulties in the manipulation of a trailer by means of a tractor or towing vehicle is jack knifing of the rig when the trailer is being backed and maneuvered into an appropriate parking location. To properly manipulate a trailer takes considerable experience and skill. At times space is limited and the excessive length of the rig, namely the length of the trailer added to the length of the towing vehicle, needs considerably more space than is customarily available to make manipulation easy. For that reason the operator often has to make many passes forwardly and in reverse to ease the trailer little by little into a proper position.

When the tractor is turned at an angle greater than permitted by the maximum cramp angle of the towed vehicle a stop is usually provided to prevent further turning. Usually a skilled operator will heed the action of the stop and change the direction of manipulation. There are unfortunately, however, many operators who fail to heed the stops and when the towing vehicle subject to manipulation imposes turning forces beyond the stop one of a number of things may happen. It may be that the towbar or drawbar will bend or that tires skid sideways, or perhaps that the stop fails and permits the wheels to turn beyond the maximum cramp angle. Sometimes also the tie-bars will buckle and under conditions of great strain castings are actually broken because of the leverage made possible, particularly close to the stop. When some of these things happen, the equipment is rendered temporarily out of service. Even under the least serious condition, the equipment is damaged and must be repaired.

It is therefore among the objects of the invention to provide a new and improved towbar and steering mechanism which substantially minimizes the usual troubles due to jack knifing.

Another object of the invention is to provide a new and improved towbar and steering mechanism which is so fabricated that additional turning force cannot be applied to the steering mechanism after the maximum cramping angle has been reached.

Still another object of the invention is to provide a new and improved torque limiting drawbar tongue assembly which is successful in avoiding damage to tie-rods, knuckle joints, drawbar fixtures and the drawbar itself when the towing vehicle is turned at an unnecessarily great angle with respect to the trailer.

Still another object of the invention is to provide a new and improved torque limiting tongue assembly for a towbar or drawbar which provides a firm nonyielding connection between the towing vehicle and the trailer within a predetermined degree of cramp angle for the wheels of the trailer and which is so designed that it will yield immediately and without resistance if the angle is exceeded, thereby completely avoiding any strain upon the parts, the mechanism remaining freely rotatable until the towing vehicle reassumes its proper direction.

Still another object of the invention is to provide a new and improved torque limiting tongue assembly for a drawbar or towbar mechanism which allows for much greater maneuverability of both the towing vehicle and the trailer when need arises to manipulate the combination in a limited space thereby to minimize parking time and also to minimize time required to resume the haul.

With these and other objects in view, the invention consists in the construction, arrangement and combination of the various parts of the device, whereby the objects contemplated are attained, as hereinafter set forth, pointed out in the appended claims and illustrated in the accompanying drawings.

In the drawings:

FIGURE 1 is a plan view showing the steering torque limiting device attached to a typical four wheel steering trailer.

FIGURE 2 is a side elevational view of the steering torque limiting device taken on the line 2—2 of FIGURE 1.

FIGURE 3 is a plan view of the steering torque limiting device showing in full lines the towing bar in towing position.

FIGURE 4 is a fragmentary plan view showing in full lines the towing bar in an extreme angular position.

In an embodiment which is primarily for the purpose of illustrating the principles involved in the steering torque limiting device here disclosed, there is shown a typical four wheel steering trailer indicated generally by the reference character 10, having attached thereto a conventional towbar or drawbar 11, the drawbar being shown in position for attachment to a tractor or towing vehicle (not shown).

The four wheel trailer is provided with fixed rear wheels 12 and 13 and steerable front wheels 14 and 15, there being a trailer body 16 supported upon the wheels.

It is significant that the front wheels are steering wheels and equipped with a steering mechanism substantially the same as those used in automotive vehicles and commonly designated as an automotive knuckle-type steering, incorporating tie-rods and king pins in the usual arrangement. More particularly, there is provided on each side of the front portion of the trailer body 16, a bracket 20 having a fixture 21 pivotally secured thereto by means of a king pin 22. A link 23 has a tie-rod 24 attached thereto by a conventional steering knuckle 25. On the opposite side is a similar link 26, tie-rod 27 and steering knuckle 28. In solid line the wheels 14 and 15 are shown in straightforward towing position. Broken lines show the wheels in the position of maximum cramping angle.

A steering torque limiting mechanism indicated generally by the reference character 30 is shown attached to a front wall 31 of the trailer body 16. The steering torque limiting mechanism is embodied in part in a mounting base 32 having an upper side 33 and a lower side 34. Bolts 35 secure the mounting base to the front wall. A bracket plate 36 extends forwardly from the lower side 34 of the mounting base and a cam plate 37 extends forwardly from a location adjacent and slightly below the upper side 33. The bracket plate and cam plate are parallel to each other and spaced a substantial distance one from another to provide for the mounting of other moving parts of the device.

The torque limiting expedient is embodied in a linkage which for purpose of explanation has been designated as constituting an aft link section 38 and a forward link section 39. The aft and forward link sections in towing position and also in backing and turning positions remain in longitudinal alignment with each other and become disaligned in angular relationship only when the limit of steering is exceeded, as shown in FIGURE 4.

The aft link section is made up of a bearing 40 in the space between the plates 36 and 37, the bearing being pivotally secured to the respective plates by employment of a pivot pin 41. A relatively short link element 42 is secured at its aft end in nonrotatable fixed relationship with the bearing 40 at the upper end of the bearing. A clevis element 43 is secured at its aft end in fixed relationship to the lower end of the bearing 40, the clevis element having an extension 44 protruding a substantial distance forwardly. A second bearing 45 is pivotally attached to the link element 42 and the clevis element 43 by means of a pivot pin 46. The bearing 45 may be construed as forming the forward portion of the aft link section 38 or in the alternative the aft portion of the forward link section 39.

Extending forwardly of the bearing 45 is what is herein designated as a guide arm 47 including suitable web stiffening members 48 and 49. A bushing 50 at the forwardmost end of the guide arm is adapted to have the aft end of the tow bar attached thereto by means of a pin 51. Attached in this fashion, the towbar can be lifted and lowered freely with respect to the remainder of the mechanism. The tie-rod 24 from the front wheel 15 is pivotally attached to the extension 44 by a suitable tie pin 52. Similarly the tie-rod 27 is attached to the opposite side of the extension 44 by an appropriate tie pin 53.

Extending upwardly from the forward portion of the guide arm 47 is a cam follower housing 55. The cam follower housing includes a stiffening web 56 and upper and lower horizontal flanges 57 and 58 respectively. A cam follower 59 is rotatably secured between the flanges 57 and 58 on the right side by means of a cam follower pin 60. Similarly on the left side a cam follower 61 is rotatably secured to the horizontal flanges 57 and 58 by a cam follower pin 62. The cam followers are adapted to roll upon an arcuate cam track 63 which forms the forward portion of the cam plate 37, already identified.

In the forward or towing position as shown by the solid lines in FIGURE 3 and also in the turning and backing position as shown by the broken lines in FIGURE 3 the aft link section and the forward link section move as a unit. This is compelled by engagement of the cam followers 59 and 61 with the cam track which forces the guide arm 47 comprising the main portion of the forward link section 39 to move as a unit with the aft link section 38. The spread of the cam followers on the cam track prevents the guide arm 47 from pivoting with respect to the aft link section 38. Therefore when the towing vehicle or tractor steers to the right or left, the tow bar 11 follows it toward the right or left and as a consequence the trailer wheels 14, 15 are steered toward the right or left respectively by action of the steering movement of the combined link sections as the extension 44 of the clevis element 43 swings to the right or left as the case may be.

When the clevis element is swung to the position which determines the maximum cramp angle of the wheels 14, 15 the aft link section 38 is prevented from moving further. A stop 64 on the right side and a similar stop 65 on the left side accomplishes this. The stops 64 and 65 extend downwardly from the under face of the cam plate 37, a distance far enough to engage the link element 42 as it swings to the maximum angular position on one side or the other.

The arcuate cam track 63 should extend to preserve contact with the cam follower 59 until contact with stop 64 is made by the link element 42. Between the point indicated as A on the cam track and the corresponding point indicated as B, the cam track is an arc of radius R about the center line of the king pin 41. When the cam follower reaches point A, which event is coincident with contact between stop 64 and link element 42, the inbound wheel 15 is turned to its broken line position in FIGURE 1 which corresponds to the maximum cramp angle of the wheel. The cam follower 59 continues in contact engagement with the portion of the cam track beyond point A as the towbar is turned beyond the position corresponding to the maximum cramp angle of the inbound wheel. This latter portion of the cam track is an arc of radius $r$ about point C, and the roller 59 will follow this portion of the cam track even though the roller 61 may clear it. The preservation of contact engagement of the cam follower and cam plate is necessary to insure contact between the stop 64 and link element 42, the effect of which is to lock the wheels at the maximum cramp angle, until the towbar returns to the position indicated by broken lines in FIGURE 3.

Assuming the swing is toward the right for the purpose of explanation as shown in FIGURES 3 and 4, the link element 42 will strike against and be held in its maximum angularly displaced position by the stop 64 as shown in FIGURE 4. When this happens the aft link section can no longer swing. Let it be assumed, however, that the towing vehicle continues to turn toward the right. This is readily permitted by reason of the fact that the stop 64 does not block movement of the forward link section 39. The forward link section embodied primarily in the guide arm 47 carrying with it the cam follower housing 55 can continue to turn and the cam followers will merely roll along the cam track 63 past point A to the solid line position shown in FIGURE 4. During this movement the guide arm 47 pivots freely on the pin 46 with respect to the aft link section 38. With this arrangement the towbar can swing to 90° and beyond without any binding or forcing of any of the parts of the device. Consequently, even though the maximum cramp angle is exceeded to a very great degree by the towbar, no damage will result to the gear by reason of the fact that the maximum cramp angle position is not exceeded by the aft link section 38 which includes the extension 44 and the tie-rods 24 and 27.

When the towing vehicle turns in the opposite direction ultimately to straighten out, the guide arm 47 pivots reversely, counterclockwise as viewed in FIGURE 4, until the cam followers 59 and 61 roll back to the portion of the cam track 63 between points A and B. When they both return to the latter portion of the cam track which is approximately the broken line position of FIGURE 3, the forward link section and aft link section will again function as a unit and steering will again commence for the trailer. Movement toward the left, namely, the opposite side has the same torque limiting effect when the link element 42 strikes against the stop 65 and causes the cam followers 59 and 61 to again roll onto the portion of the cam track 63 beyond point B on the left-hand side. By acting in the fashion described, the device herein disclosed permits a maximum degree of maneuverability in that the towing vehicle can move freely far beyond movement which would ordinarily be permitted by the maximum cramp angle of the wheels without damage in any way to the gear or to the trailer steering apparatus. Despite the excessive movement permitted, a steering relationship is immediately resumed when the drawbar is moved back within the range of steering of the trailer steering mechanism. Fixed relationships are reassumed and normal steering manipulation is experienced.

While the invention has herein been shown and described in what is conceived to be the most practical and preferred embodiment, it is recognized that departures may be made therefrom within the scope of the invention which is not to be limited to the details disclosed herein but is to be accorded the full scope of the claims so as to embrace any and all equivalent devices.

Having described the invention, what is claimed as new in support of Letters Patent is:

1. A steering torque limiting mechanism comprising a bracket assembly, a linkage system comprising an aft link section and a forward link section pivotally connected to each other, said aft link section being pivotally attached to said bracket assembly and having a steering attachment mounted directly thereon including an extension rigid on the aft link section and said forward link section having a draw bar attachment mounted directly thereon including a link element rigid on the forward link section, cooperating guide means respectively on said bracket assembly and on said forward link section which remain in operative engagement during pivotal movement of said forward link section through a given normal steering angle for restraining said link sections against relative pivotal movement, thereby to cause pivotal steering movements of said aft link section through said angle with said forward link section, and which cooperating means move out of operative egagement to release said forward link section for pivotal movement relative to said aft link section upon pivotal movement of said forward link section beyond said normal steering angle, and stops acting between said bracket assembly and said aft link section at the ends of the arc of said angle, whereby to limit steering movement of said steering attachment when said draw bar attachment goes beyond the limit of steering movement of the steering attachment.

2. A steering torque limiting mechanism comprising a bracket assembly having upper and lower spaced horizontal plates, a linkage system comprising an aft link section and a forward link section pivotally connected to each other, said aft link section being pivotally attached to said bracket assembly and having a steering attachment mounted directly thereon and said forward link section having a draw bar attachment, stops acting between said bracket assembly and said aft link section at angular limits of turning movement of said aft link section, a cam track on one of said plates extending between said stops, and cam follower means on said forward link section adapted to engage said cam track within said limits of turning movement and to roll off and return to said cam track when said aft link is stopped from turning by said stops.

3. In a tractor and trailer rig including a trailer having a two wheel stering mechanism and a draw bar for connecting the tractor with the trailer the combination of a steering torque limiting mechanism comprising a bracket member for the trailer having upper and lower spaced horizontal plates, a linkage system comprising an aft link section and a forward link section pivotally connected to each other, said aft link section being pivotally attached to said plates and having a steering attachment mounted directly thereon and said forward link section having a link element thereof adapted for attachment to the draw bar, stops on opposite sides of said bracket member engageable with said aft link section at angular limits of turning movement of said aft link section, a cam track on one of said plates extending between said stops, and cam follower means on said forward link section adapted to engage said cam track within said limits of turning movement and to roll off and return to said cam track when said aft link is stopped from turning by said stops.

4. In a tractor and trailer rig including a trailer having a two wheel steering mechanism and a draw bar for connecting the tractor with the trailer the combination of a steering torque limiting mechanism including a bracket assembly comprising a mounting base for the front of the trailer having upper and lower sides, a bracket plate extending forwardly from one of said sides and a cam plate extending forwardly from the other of said sides and forming a space between said plates, an aft link section comprising a vertical aft bearing in said space and a pin rotatably securing said aft bearing to at least one of said plates, a clevis element including an extension and a link element fixed at aft ends in spaced parallel relationship on said bearing, a forward bearing pivotally secured to forward ends of said elements and a forward link section comprising a guide arm secured to forward bearing at location spaced vertically from said extension, said extension being adapted to be attached to respectively left and right-hand steering rods and said guide arm being adapted for attachment to said draw bar, a horizontal cam track on said cam plate, a cam follower housing on said guide arm and cam means on said housing in camming engagement with said cam track, and stops on opposite sides of said bracket assembly engageable with said aft link section at angular limits of movement of said aft link section whereby said cam means is adapted to move off and on said cam track accompanied by said guide arm while said aft link section is in a turn limiting engagement with one of said stops, whereby steering movement of said wheels is stopped while turning movement of said draw bar continues.

5. In a tractor and trailer rig including a trailer having a two wheel steering mechanism and a draw bar for connecting the tractor with the trailer the combination of a stering torque limiting mechanism comprising a mounting base for the front of the trailer having upper and lower sides, a bracket plate extending forwardly from one of said sides and a cam plate extending forwardly from the other of said sides and forming a space between said plates, an aft link section comprising a vertical aft bearing in said space and a pin rotatably securing said bearing to said plates, a clevis element including an extension and a link element fixed at aft ends in spaced parallel relationship on said aft bearing, a forward bearing pivotally secured to forward ends of said elements and a forward link section comprising a guide arm secured to said forward bearing at location spaced vertically from said extension, said extension being adapted to be attached to respectively left and right-hand steering rods and said guide arm being adapted for attachment to said draw bar, a horizontally arcuate cam track on a forward edge of said cam plate, a cam follower housing on said guide arm and a pair of horizontally spaced cam followers on said housing in rotatable engagement with said cam track, and stops on opposite sides of said cam plate engageable with said aft link at angular limits of movement of said link whereby said cam followers are adapted to roll off and on said cam track accompanied by said guide arm while said aft link section is in a turn limiting engagement with one of said stops, whereby steering movement of said wheels is stopped while turning movement of said draw bar continues.

6. A steering torque limiting mechanism comprising a bracket assembly, a linkage system including an aft link section and a forward link section pivotally connected to one another for turning about a first pivot axis, means pivotally connecting said aft link section to the bracket assembly for turning about a second pivot axis approximately parallel to and spaced from said first axis, cooperating means on said bracket assembly and said forward link section which remain in operative engagement for restraining said link sections against relative pivotal movement about said first axis, thereby to retain said link sections in a fixed relative angular position, during pivotal movement of said forward link section through a given normal steering angle and which cooperating means move out of operative engagement to release said forward link section for swinging relative to said aft link section about said first axis upon pivotal movement of said forward link section beyond said normal steering angle, a steering attachment mounted directly on said aft link section including a steering extension rigid on the latter section, and a draw bar attachment mounted directly on said forward link section including a draw bar link element rigid on the latter section.

7. A steering torque limiting mechanism according to claim 6 wherein said cooperating means comprises a member mounted on said forward link section in such manner that a given spacing exists between said member and said second axis when said link sections occupy said fixed relative angular position and said spacing decreases upon relative pivotal movement of said link sections from said relative angular position, and means on said bracket assembly engageable by said member during pivotal movement of said forward link section through said normal steering angle for maintaining said given spacing between said member and said second axis, thereby to retain said link sections in said fixed relative angular position, and for releasing said member from movement toward said second axis upon pivotal movement of said forward link section beyond said normal steering angle, whereby to permit said forward link section to pivot relative to said aft link section.

References Cited by the Examiner

UNITED STATES PATENTS

| | | | |
|---|---|---|---|
| 2,734,754 | 2/56 | Barker | 280—103 |
| 2,974,978 | 3/61 | Isachsen | 280—103 |
| 3,108,821 | 10/63 | Krauss | 280—103 |

FOREIGN PATENTS 813,344  9/51  Germany.

A. HARRY LEVY, *Primary Examiner.*

KENNETH H. BETTS, *Examiner.*